(12) United States Patent
Kravitz et al.

(10) Patent No.: US 8,326,142 B2
(45) Date of Patent: Dec. 4, 2012

(54) OPTICAL IMAGE SYSTEMS

(75) Inventors: Arnold Kravitz, Moorestown, NJ (US); Jongjin George Kim, East Windsor, NJ (US); Sergey Gershtein, Skillman, NJ (US)

(73) Assignee: SRI International, Menlo Park, CA (US)

( * ) Notice: Subject to any disclaimer, the term of this patent is extended or adjusted under 35 U.S.C. 154(b) by 250 days.

(21) Appl. No.: 12/788,687

(22) Filed: May 27, 2010

(65) Prior Publication Data

US 2011/0200319 A1    Aug. 18, 2011

Related U.S. Application Data

(60) Provisional application No. 61/303,818, filed on Feb. 12, 2010, provisional application No. 61/320,798, filed on Apr. 5, 2010.

(51) Int. Cl.
| G03B 41/00 | (2006.01) |
| H04N 13/02 | (2006.01) |
| H04N 5/33 | (2006.01) |
| G06K 7/10 | (2006.01) |

(52) U.S. Cl. .......... 396/333; 396/334; 348/47; 348/164; 359/350

(58) Field of Classification Search .......... 396/325, 396/322, 333; 348/47, 48, 164; 359/350
See application file for complete search history.

(56) References Cited

U.S. PATENT DOCUMENTS

| 6,781,127 B1 | 8/2004 | Wolff et al. |
| 2005/0029458 A1* | 2/2005 | Geng et al. ..................... 250/347 |

OTHER PUBLICATIONS

Wang et al., "A Comparative Analysis of Image Fusion Methods," IEEE Transactions on Geoscience and Remote Sensing, vol. 43, No. 6 (Jun. 2005).

ISP Optics Corp., Optical Materials Specifications, Zinc Sulfide Cleartran®, Zinc Selenide Window Grade (ZnSe), Zinc Selenide Laser Grade (ZnSe CVD) and Beamsplitter Gold Dichroic, ISP Optics, http://www.ispoptics.com/OpticalMaterialsSpecs.htm (2009).

* cited by examiner

*Primary Examiner* — Rochelle-Ann J Blackman
(74) *Attorney, Agent, or Firm* — Marger Johnson & McCollom PC

(57) ABSTRACT

The present invention is an optical image system having at least a first camera including a first lens and at least a second sensor including a second lens. The system also includes at least one beam splitter for transmitting an incoming beam of electromagnetic radiation of at least a first band of wavelength to a focal plane array of the first camera and reflecting an incoming beam of electromagnetic radiation of at least a second band of wavelength to a focal plane array of the second camera. The first lens is positioned behind the beam splitter for focusing the beam of the first band of wavelength onto an image at the focal plane array of the first camera and the second lens is positioned behind the beam splitter for focusing the beam of the second band of wavelength onto the image at the focal plane array of the second camera.

24 Claims, 7 Drawing Sheets

OPTICAL IMAGE SYSTEMS

CROSS-REFERENCE TO RELATED APPLICATIONS

This application claims the benefit of U.S. Provisional Patent Application No. 61/303,818, filed Feb. 12, 2010, titled, "Parallax-Free Optical System/Camera" and also claims the benefit of U.S. Provisional Patent Application No. 61/320,798 filed Apr. 5, 2010, titled, "Parallax-Free Optical System/Camera", both of which is herein incorporated by reference.

FIELD OF THE INVENTION

The invention relates generally to optical systems. More specifically, the invention relates to an improved optical image system for fusing images of various wavelengths while eliminating parallax effects and chromatic abberation.

BACKGROUND OF THE INVENTION

Fused imagery of multiple different sets of wavelengths of light such as Infrared, visible etc. is distorted, non-uniformly, focused, missaligned and rendered useless by excessive parallax. This degradation is heightened by a large depth of field and near camera imagery. Large depths of field images have excellent electronic fusion at specific ranges but not across the whole field due to parallax. Specifically, when objects are within a certain fixed range of a binocular color and IR camera, the parallax problem cannot be solved. In fact, this problem becomes worsened when more than two cameras are involved. This inovation holds fusion when imaging from a moving platform and while observing moving subjects traversing the debth of field.

Another problem with the prior art is the chromatic abberation. This is a type of distortion in which there is a failure of a lens to focus all colors to the same convergence point. It occurs because lenses have a different refractive index for different wavelengths of light (the dispersion of the lens). The refractive index decreases with increasing wavelength. A typical example is disclosed in U.S. Pat. No. 6,781,127, in which the camera lenses are placed in front of the dichroic beam splitter which transmits thermal IR radiation and reflects visible/NIR/SWIR radiation.

Thus, there is a need in the art to provide an optical image system that has a capbabliltiy of fusing images of various wavelengths while eliminating both the parallax effects and chromatic abberation.

SUMMARY OF THE INVENTION

The present invention provides an optical image system including a first camera having a first lens and a second camera having a second lens. The system also includes at least one beam splitter for transmitting an incoming beam of electromagnetic radiation of at least a first band of wavelength at a focal plane array of the first camera and reflecting an incoming beam of electromagnetic radiation of at least a second band of wavelength at a focal plane array of the second camera. The first lens is positioned behind the beam splitter for focusing the beam of at least the first band of wavelength onto an image at the focal plane array of the first camera and the second lens is positioned behind the beam splitter for focusing the beam of the at least the second band of wavelength onto the image at the focal plane array of the second camera.

The present invention also provides a method of providing a fused image. The method includes transmitting an incoming beam of electromagnetic radiation of at least a first band of wavelength to a focal plane array of at least a first sensor and reflecting an incoming beam of electromagnetic radiation of at least a second band of wavelength to a focal plane array of at least a second camera. The method also includes focusing a beam of at least the first band of wavelength onto an image at the focal plane array of the first camera. The method further includes focusing the beam of at least the second band of wavelength onto the image at the focal plane array of the second camera.

DETAILED DESCRIPTION OF THE INVENTION

The present invention solves the problem of parallax by an application of a beam splitter which splits an incoming beam of electromagnetic radiation by transmitting or reflecting the beam depending on the waveband. Individual sensors commonly known as cameras are sensitive to each split beam receive the split beam and if equipped with a zoom lens they adjust their zoom for magnification. A processor controls all the camera zooms such that the image size in all cameras are equal at all levels of zoom. The placement of the lens behind the beam splitter allows the use of a wide variety of narrow chromatic band lenses that are chromatically optimized for each camera. This flexibility in lens selection enables a design with a wider range of environmental robustness. It also allows for a larger range of material choices for use in the lens system. This expansion of material choice enables the creation of a parallax free fused camera systems that can span a much larger section of the electromagnetic spectrum with less chromatic aberations than those that rely on a common lens system in front of a dichroic optic. The other advantage is a re-distribution of the center of mass to produce a camera with a reduced moment of inertia. This makes the camera easier to balance when integrated into an articulated imaging system. The zoom lenses equipped in the cameras are calibrated together such that their magnifications are aligned across the range of zoom. The F number of the zoom lenses are also aligned across the depth of zoom to keep a constant depth of field in each camera. Further, the present invention ensures chromatically optimized lenses are used for each band, image magnification from each camera (image size) is constant across all the cameras, and depth of field is constant across all cameras (consistent sharp focal distances are the same in all cameras). A Lapacian pyramid based process is used to rotate and flip the images, thus eliminating the need for extra mirrors, to normalize the contrast across the camera imagery, and to fuse the images. A single focus lens is a variant of this invention as it represents a zoom lens with a static focal point. All references to a zoom lens in the present invention is meant to include a single focus lens. The details of the present invention are provided below with respective to the perspective drawing figures.

Figure 1:
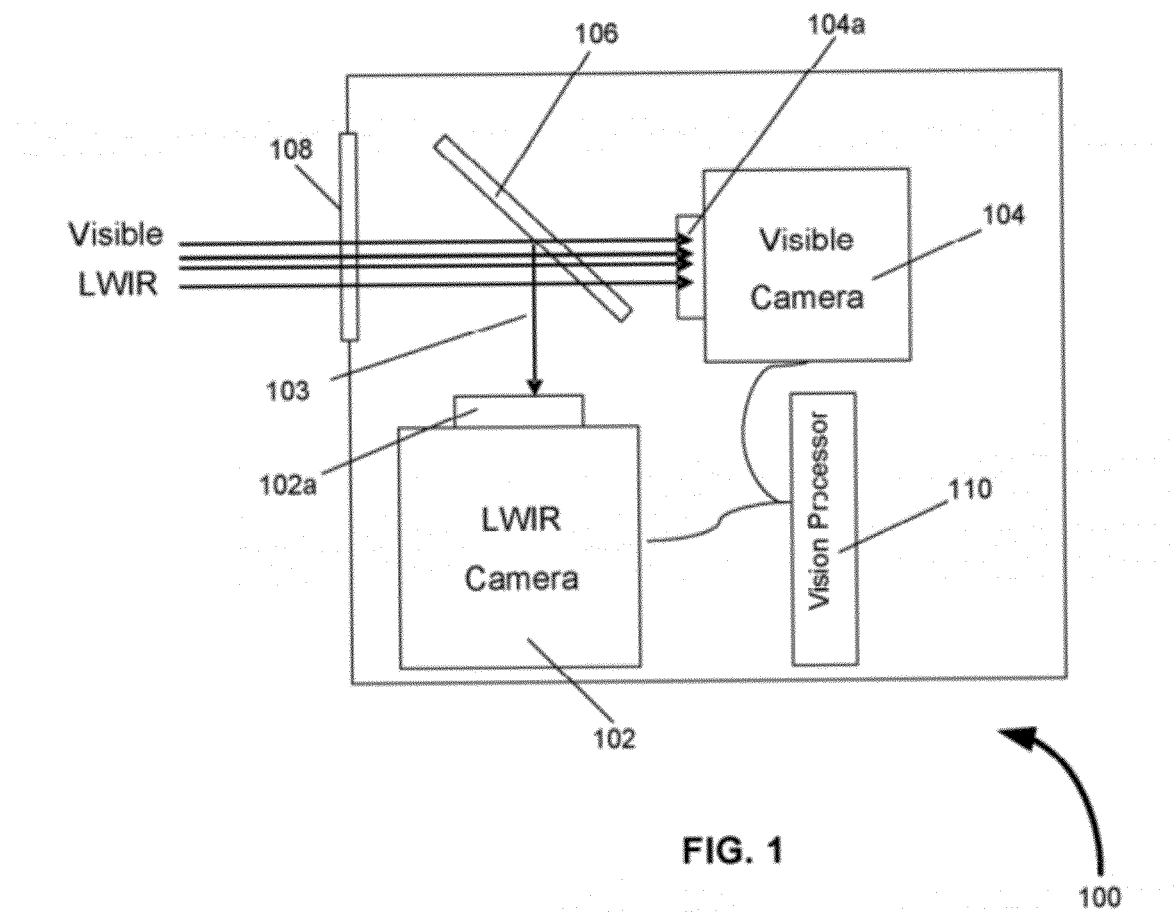
FIG. 1 illustrates an optical image system for fusing images of different wavelengths in accordance with an embodiment of the present invention.

Referring to FIG. 1, there is illustrated a schematic diagram of an optical image system 100 to fuse images in accordance with one embodiment of the present invention. The system 100 includes primary optical components such as LWIR sensor/camera 102 with its corresponding at least one zoom lens 102a, Visible sensor/camera 104 with its corresponding at least one zoom lens 104a, both of which are placed behind a beam splitter 106, preferably a dichroic splitter as shown in FIG. 1. The system 100 also includes a wide band window 108 which initially receives electromagnetic beams of at least two different bands of wavelengths, the visible (RGB) radiation 101 preferably having wavelength in the range of 400 nanometers (extreme violet) to 950 nanometers (near IR), and the LWIR 103, having wavelength in the range of 8 micrometers to 15 micrometers. The system further includes a computational processing component such as vision processor 110 for processing the images received by the cameras 102 and 104. Optically fused parallax free dual band cameras 102 and 104 solve the problems cited above by eliminating the parallax at its root as will be described in greater detail below.

Figure 2:
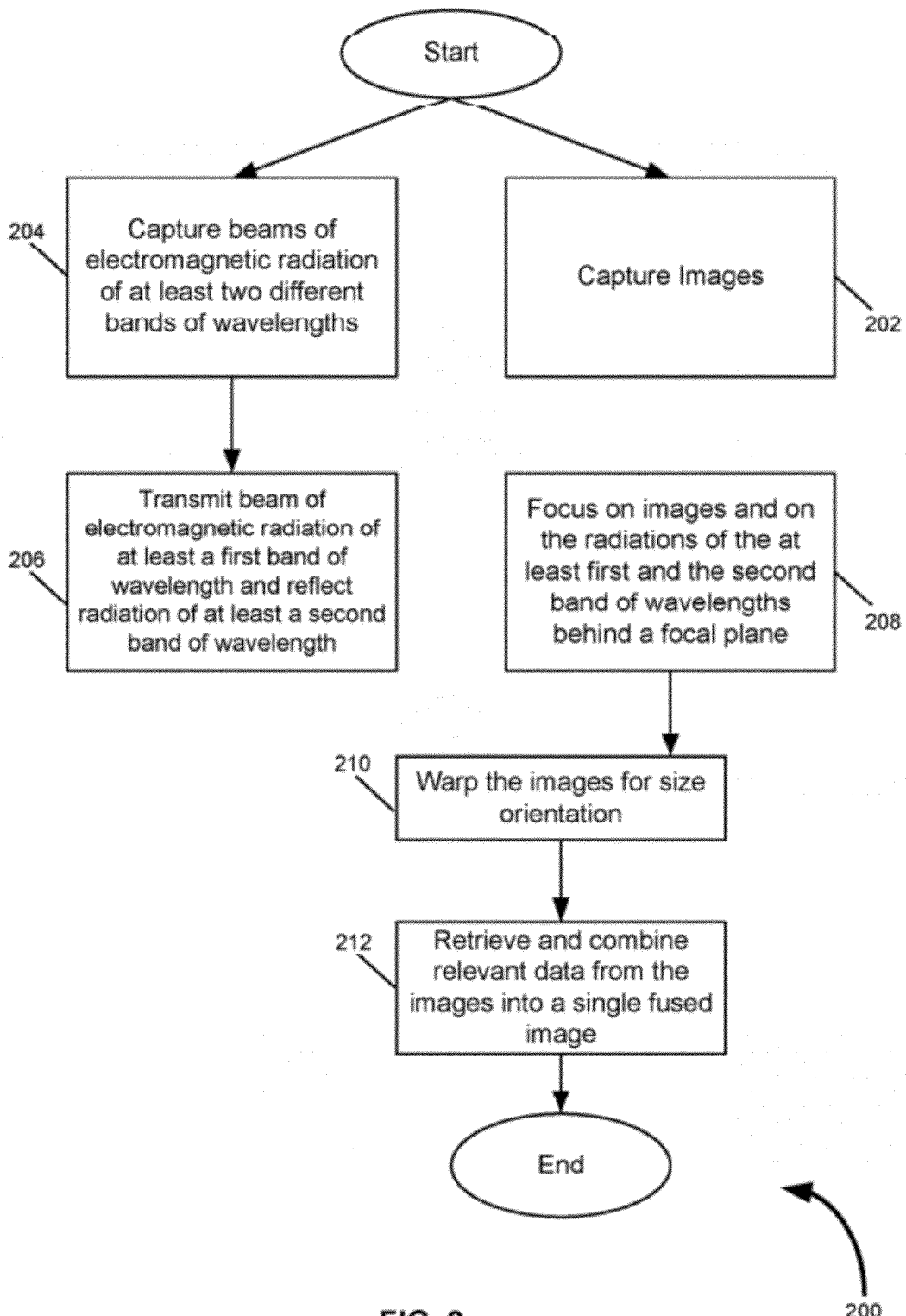
FIG. 2 illustrates flow diagram of a method for fusing images of different wavelengths in accordance with the embodiment of the present invention.

FIG. 2 refers to a flow chart of a method for providing a fused image. Initially at step 202, images are captured by the two cameras 102 and 202 of the system 100. Simultaneously, in step 204, the two different beams, visible radiation 101 and the LWIR 103 are captured or sensed by the system 100 both of which pass through the wide band window 108 made of a material which is continuously transmissive/transparent from visible light to the long wave infrared radiation (LWIR). The window 108 functions to prevent any contaminants from entering the camera system 100 and also serves as a sacrificial element to protect the internal optics from salt fog, mud, and dirt during cleaning, and to seal the environment to prevent dust and humidity from degrading the internal system optics and further to serve as a substrate for anti icing and anti fog ohmic heating coils or other anti icing and anti fog solutions. One typical material for the window 108 is preferably zinc sulfide although other materials can be used.

The electromagnetic beams 101 and 103 are then received by the dichroic beam splitter 106 in step 206 such that the visible radiation beam 101 is transmitted at a focal plane array of the corresponding visible camera/sensor 104 and the LWIR radiation beam 103 is reflected at a focal plane array of the corresponding LWIR camera/sensor 102. The dichroic beam splitter 106 consists of an optical coating deposited on a material substrate. The optical coating is designed to optimize the amount of beam splitter reflection/transmission respective to the corresponding desired spectrums of radiation to be imaged and then fused. For instance, if it is desired to fuse imagery produced from radiation in the 0.4-0.95 micron region with imagery produced from radiation in the 8-14 micron region, then an optical coating in combination with the material substrate must be designed to maximize reflection of 0.4-0.95 micron radiation while maximizing transmission of 8-14 micron radiation. Examples of dichroics with these desired properties are identified in ISP Optics Corp., Optical Materials Specifications, Zinc Sulfide Cleartran ®, Zinc Selenide Window Grade (ZnSe), Zinc Selenide Laser Grade (ZnSe CVD) and Beamsplitter Gold Dichroic, ISP OPTICS, http://www.ispoptics.com/Optical-MaterialsSpecs.htm . While in FIG. 1 the visible radiation 101 is depicted to be transmitted through the dichroic beam splitter 106 with the LWIR radiation 103 is reflected, it may be that in some instances it is more optimal to reflect the visible radiation while transmitting LWIR radiation with respect to the beam splitter.

So, the parallax free fusion is enabled by initial application of a dichoric splitter 108 which splits the beams by the wave band prior to being focused by the camera lenses 102a and 104a. In this approach, the imagery is bore sight aligned by positioning the lenses in order to ensure optimum focused image. The lenses 102a and 104a preferably zoom and focus into the imagery captured by the cameras 102 and 104 respectively along with their corresponding light beams 101 and 103 respectively at step 208 at the focal plane of their respective cameras 102 and 104. The parallel free fusion images are further processed by warping the images for size and orientation at step 210. Specifically, these lenses 102a and 104a are controlled by the vision processor 110 such that the size of the image and/or the objects in the image on each of the lenses 102a is the same when the image is preferably magnified by the lenses. The processor 110 also controls the lenses 102a and 104a of the cameras such that the center point of each of the cameras 102 and 104 respectively is the same and the field of view (FOV) of each camera controlled by the (zoom) lenses 102a and 104a respectively is always the same. Thus, the alignment and the size of the imagery always remains the same in the two cameras 102 and 104. Thereafter, relevant data/information from the images from one of the bands of the two cameras 102 and 104 are retrieved and combined into a single fused image by the vision processor 110 at step 212. This relevant data is based on the Lapacian pyramid based process which preferably functions in the spatial frequency domain. Specifically, objects with edges have high energy in this domain, which are caused due to the rapid change in spatial frequency. So, the pixels of an edge that has the highest local energy in each of the images are retrieved to be combined into a single fused image. The pyramid fusion process fuses these objects from multiple cameras into a new image by using the pixels with the highest local energy. The pixels of object edges have the highest local energy. Thus the fused image objects appear with sharp edges. Theoretical description of this and other methods are described in detail in "A Comparative Analysis of Image Fusion Methods", Zhijun Wang, Djemel Ziou, Costas Armenakis, Deren Li, and Qingquan Li, *IEEE TRANSACTIONS ON GEOSCIENCE AND REMOTE SENSING*, VOL. 43, NO. 6, JUNE 2005.

As discussed above, the lenses 102a and 104a are enabled by the individual cameras 102 and 104 behind the dichroic beam splitter 108. When equipped with zoom, these zoom lenses are calibrated and controlled by the vision processor together such that the magnifications are equal across the levels of zoom. As a result, a user can scan a crowd and zoom in and out on subjects and concealed objects are visible in the subjects. For example, these concealed objects are visible below clothing for humans. LWIR, and visible bands (or any mix of optical bands) are seen in the same image without parallax misalignment or depth of field mismatch (focus mismatch) even when the subject is moving closer to or away from the camera.

Figure 1A:
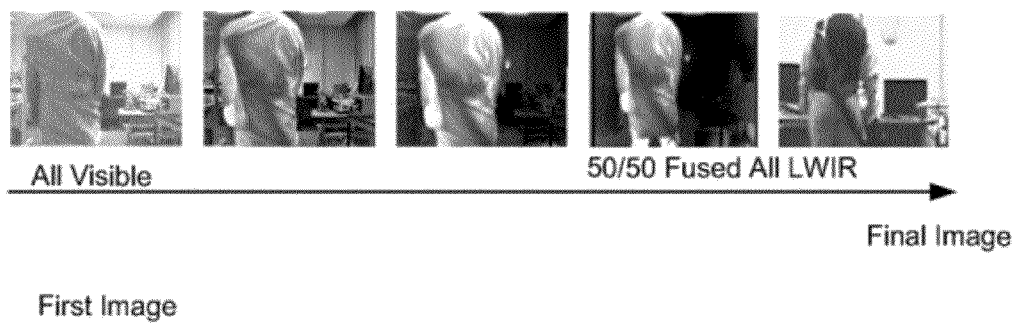
FIG. 1A illustrates an example of an image sequence taken with the optical image system of FIG. 1.

An example of the image sequence taken with the optical image system 100 is illustrated in FIG. 1A. This image sequence is taken with the LWIR/Visible dual band fused camera showing a concealed rifle with various amounts of fusion from all visible, to 50/50 fused to all LWIR. It is noted that the color detail of the visible image and the LWIR detail of the weapon. It is further noted that the fusion is held with the object near the camera in the first image and far from the camera in the final images.

Figure 1B:
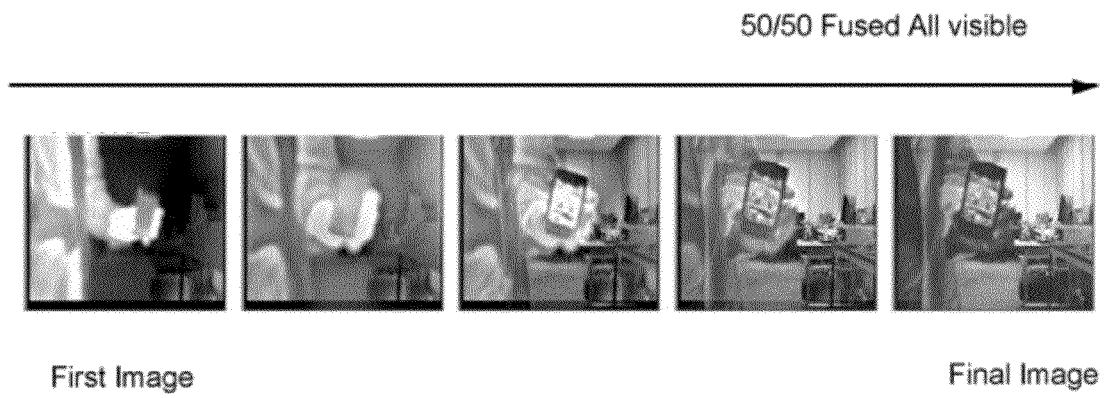
FIG. 1B illustrates an example of an image sequence taken with the optical image system of FIG. 1.

Another example of the image sequence taken with the optical image system 100 is illustrated in FIG. 1B. This image sequence is also taken with the LWIR/Visible dual band fused camera. The imagery shows visible band light illumination through a glass screen of a device at with various amounts of fusion from all LWIR, to 50/50 fused to all Visible. It is noted in the fused image the color detail of the visible image and the IR thermal detail are both present.

Figure 1C:
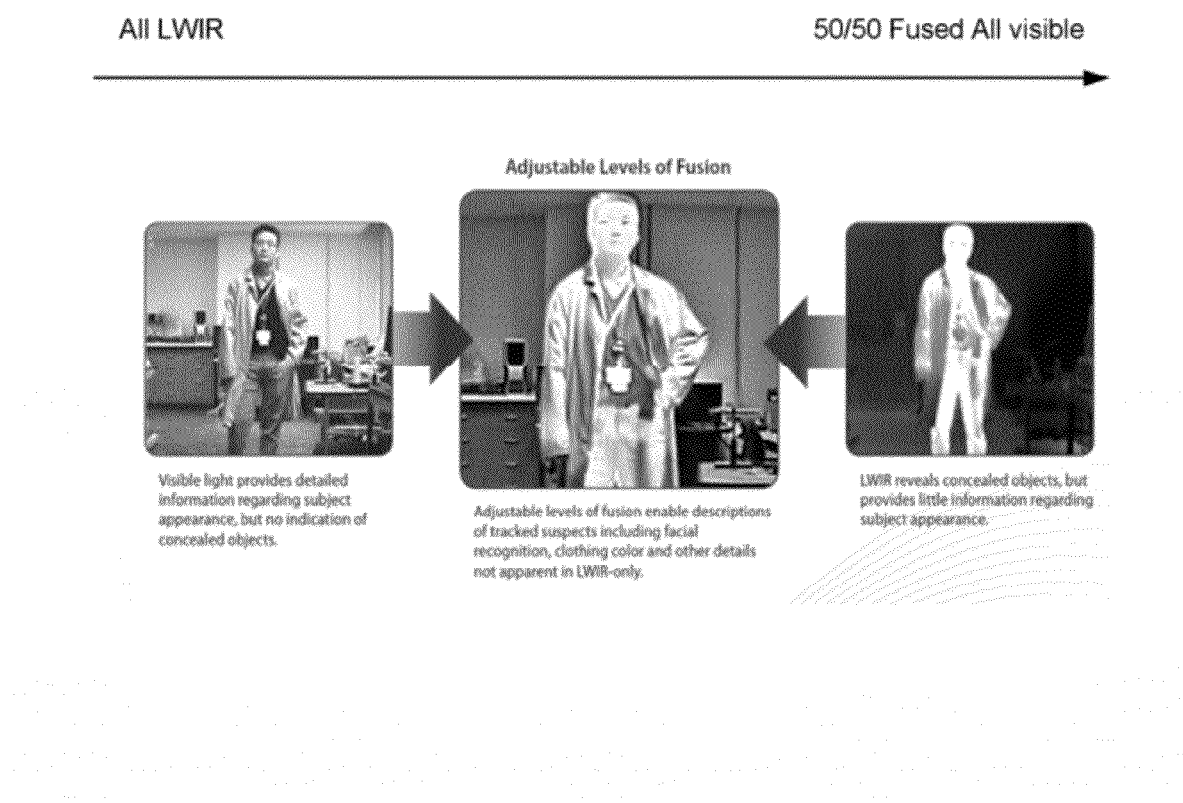
FIG. 1C illustrates an example of an image sequence taken with the optical image system of FIG. 1.

A further example of the image sequence taken with the optical image system 100 is illustrated in FIG. 1C. This image sequence is also taken with the LWIR/Visible dual band fused camera. Specifically, FIG. 1C shows a fused image of a subject with a concealed object in his pocket with various amounts of fusion from all LWIR, to 50/50 fused to all Visible. It is noted in the fused image the color detail of the visible image and the IR thermal detail are both present. Also, the facial features of the subjects are visible allowing facial feature identification, clothing color descriptions, and pattern descriptions. This novel feature allows subjects to be easily tracked in crowds, and to feed facial recognition systems to identify subjects using facial feature identification systems. Since this novel parallax-free approach holds the fusion over the depth of field, a meandering subject in a crowd can be easily identified and tracked by the information available from the imagery which includes facial features, clothing colors, and clothing patterns.

Furthermore, by placing the lenses 102a and 104a behind the dichroic splitter 108 of the camera system 100, chromatic aberration is also significantly reduced. As known in the prior art, compromises are generally made in lens design to achieve chromatic balance. The wider the band path of the optical system, the greater the compromises are made which reduces the overall quality of the image. However, in each of the lenses 102a and 104a of the camera system 100, both the imagery and the corresponding light beams 101 and 103 respectively are chromatically balanced with fewer compromises because the lenses 102a and 104a individually path a narrower chromatic band width than a single lens passing both bands. This provides the ability to design an optical system with superior chromatic performance than a system using a single lens passing multiple chromatic bands. This is completely different from the prior art U.S. Pat. No. 6,781, 127 where the imagery is produced using a single lens that passes both (or multiple) chromatic bands. So, by placing both the imagery and the light beams focused in the same plane, the lenses 102a and 104a can focus all colors of light of different wavelengths to the same convergence point in the imagery, resulting in a chromatically balanced image.

Furthermore, by placing the lenses 102a and 104a behind the dichroic splitter 108, center of mass of the camera is shifted to the center of the camera body 100. This greatly reduces the camera moment of inertia reducing the effort required to balance this type of camera in an articulated imaging system. Further this reduction in moment of inertia requires less counter balancing to balance the camera resulting in overall reduction of system weight of the system described by the prior art U.S. Pat. No. 6,781,127.

Although camera 102 is illustrated as a visible camera in FIG. 1, it is known to one of ordinary skill in the art that other cameras such as short wavelength infrared (SWIR) camera, medium wavelength infrared (MWIR) camera, may be utilized for their corresponding SWIR light beam and MWIR light beam which are transmitted from the dichroic splitter 106. Similarly, even though camera 104 is illustrated as a LWIR camera, it is known to one of ordinary skill in the art that other cameras such as SWIR camera, MWIR camera may be utilized for their corresponding SWIR light beams and the MWIR light beam which are reflected by the dichroic splitter 106.

Figure 3:
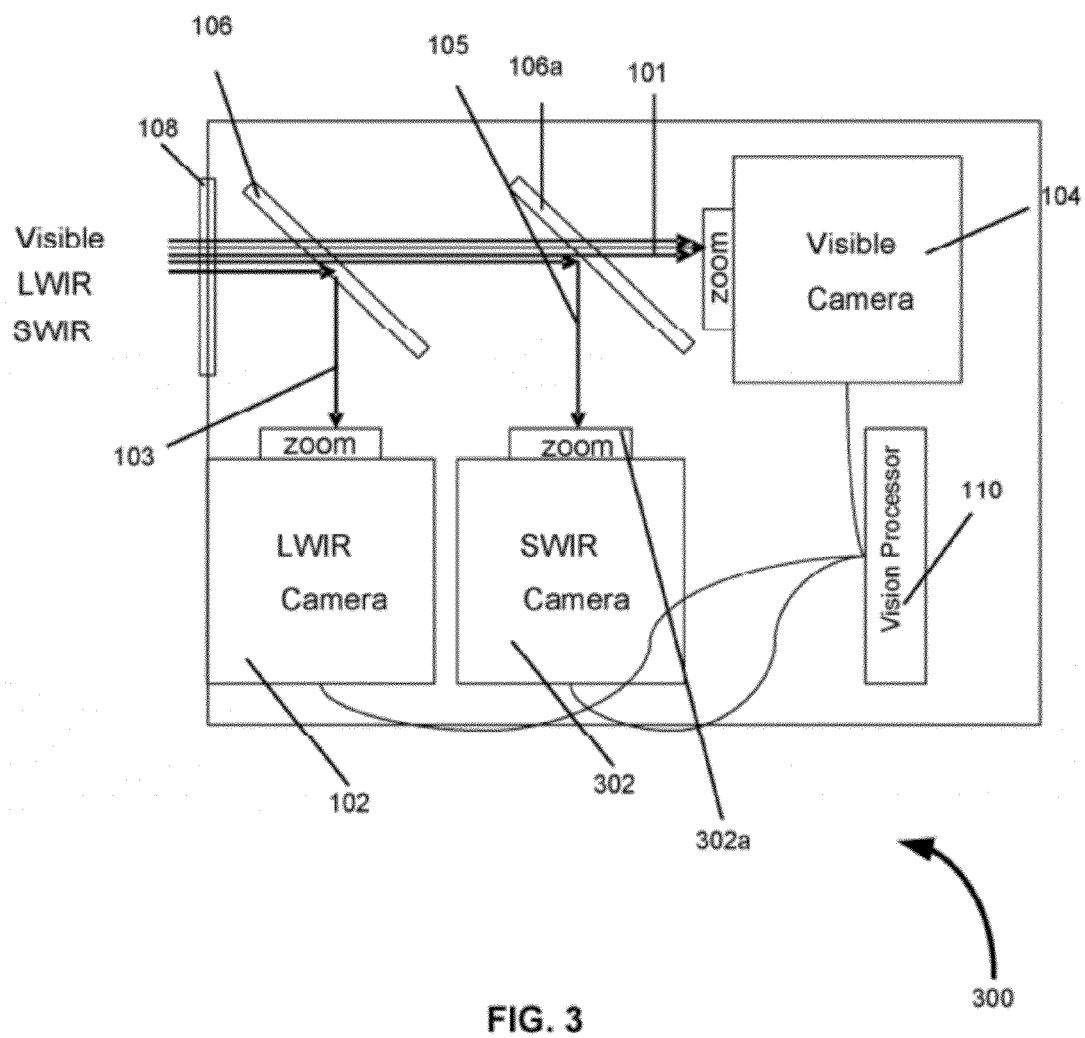
FIG. 3 illustrates an optical image system in accordance with another embodiment of the present invention.

Referring to FIG. 3, there is illustrated a schematic diagram of an optical image system 300 for fusing images in accordance with another embodiment of the present invention. This system 300 is similar to the system 100 except a third camera 302 preferably an SWIR camera, with its corresponding (zoom) lens 302a is added to the system as shown. Due to the addition of a third camera 302, a second dichroic beam splitter 106a is also added preferably in parallel position to the dichroic beam splitter 106. The second dichroic beam splitter 106a allows the extraction of specific bands of light to be steered into the appropriate band cameras. So, a one beam splitter camera pair is required for each of the optical bands desired to be separately imaged. This enables the Lapacian fusion process running in the vision processor 110 to fuse the relevant information only apparent in specific band to form a single unified image. As illustrated in FIG. 2, light/IR radiation of at least three different bands of wavelengths, the visible (RGB) radiation 101, the LWIR 103, and the SWIR beam 105 having wavelength in the range of 1 micrometer to 3 micrometers are sensed by the system 300. So, initially, three beams visible light beam 101, LWIR beam 103 and the SWIR beam 105 all pass through the wide band window 108 made of a material which is continuously transmissive/transparent from visible light to the long wave infrared radiation (LWIR). The three electromagnetic beams 101, 103 and 105 are then received by the dichroic beam splitter 106 such that the visible radiation beam 101 is transmitted at a focal plane array of the corresponding visible camera/sensor 104, while the LWIR radiation beam 103 is reflected at a focal plane array of the corresponding LWIR camera/sensor 102. The SWIR radiation beam 105 is also transmitted through the dichroic beam splitter 106 which is then reflected by the dichroic beam splitter 106a at a focal plane array of the corresponding SWIR camera/sensor 302. The beam splitter 106 reflects the LWIR band (14-8 um) while passing through the 8-0.4 um light. The second beam splitter 106a reflects the SWIR band (8-1 um) while passing through the 1-0.4 um light. The dichroic beam splitters 106 and 106a consist of optical coating deposited on a material substrate. As discussed above, the optical coating is designed to optimize the amount of beam splitter reflection/transmission respective to the corresponding desired spectrums of radiation to be imaged and then fused. Thereafter, relevant data/information from the imagery from one of the bands of the three cameras 102, 104, and 302 are retrieved and combined into a single fused image by the vision processor 110. This relevant data is based on the Lapacian pyramid based process as described above.

Figure 4:
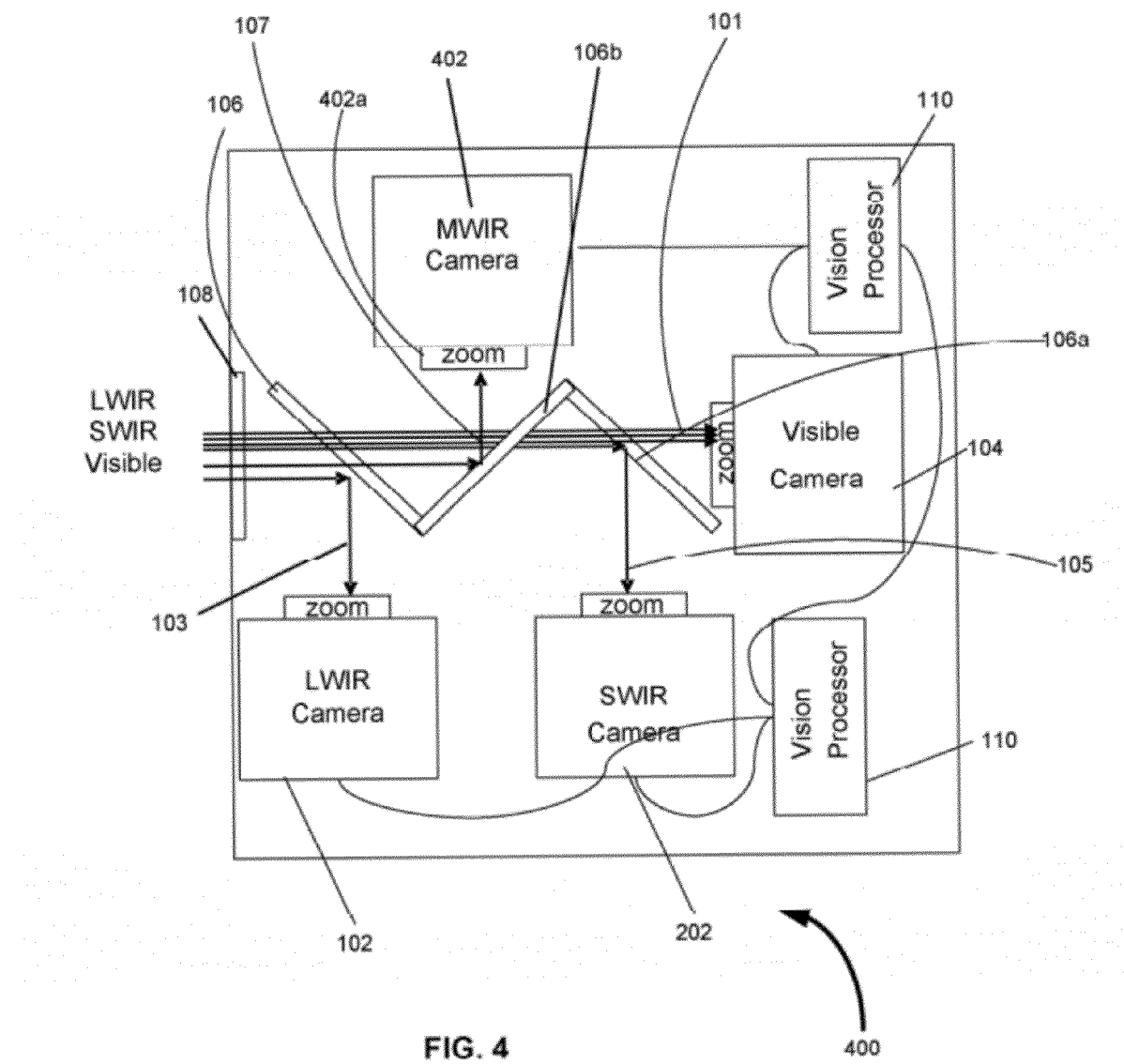
FIG. 4 illustrates an optical image system in accordance with even further embodiment of the present invention.

Referring to FIG. 4, there is illustrated a schematic diagram of an optical image system 400 for fusing images in accordance with another embodiment of the present invention. This system 400 is similar to the system 300 except a fourth camera 402 preferably an MWIR camera with its corresponding (zoom) lens 402a is added to the system as shown. Due to the addition of the fourth camera, MWIR camera 402, a third dichroic beam splitter 106b is also added. The beam splitter 106 reflects the LWIR band (14-8 um) while passing through the 8-0.4 um light. The second beam splitter 106a reflects the MWIR band (8-3 um) while passing through the 3-0.4 um light. The third beam splitter 106b reflects the SWIR band (3-1 um) while passing through the 1-0.4 um light. As illustrated in FIG. 3, light/IR radiation of at least four different bands of wavelengths, the visible (RGB) radiation 101, the LWIR 103, the SWIR beam 105 and the MWIR beam having wavelength in the range of 3 micrometers to 5 micrometers are sensed by the system 400. So, initially, four beams visible light beam 101, LWIR beam 103, the SWIR beam 105 and the MWIR beam 107, all pass through the wide band window 108 made of a material which is continuously transmissive/transparent from visible light to the long wave infrared radiation (LWIR). The four electromagnetic beams 101, 103, 105 and 107 are then received by the dichroic beam splitter 106 such that the visible radiation beam 101, and SWIR beam 105 and the MWIR beam 107 are transmitted through the dichroic splitter 106, while the LWIR radiation beam 103 is reflected at a focal plane array of the corresponding LWIR camera/sensor 102. This if followed by the MWIR beam 107 being reflected by a third dichoric beam splitter 106*b* at a focal plane array of the corresponding MWIR camera 402 while the visible beam 101 and the SWIR beam 105 being transmitted through the third dichroic beam splitter. Then, the SWIR radiation beam 105 is reflected by the first dichroic beam splitter 106*a* at a focal plane array of the corresponding SWIR camera/sensor 302, while the visible beam 101 is transmitted through the first beam splitter 106*a* directly to the visible camera 104. The dichroic beam splitters 106, 106*a* and 106*b* consist of optical coating deposited on a material substrate. As discussed above, the optical coating is designed to optimize the amount of beam splitter reflection/transmission respective to the corresponding desired spectrums of radiation to be imaged and then fused. Thereafter, relevant data/information from the images from one of the bands of the three cameras 102, 104, and 302 are combined into a single fused image by the vision processor 110. This relevant data is based on the Lapacian pyramid based process as described above.

Even though not shown, the images captures in step 202 in FIG. 2, may preferably be further processed by vision processor 110. Such processing includes but is not limited to conditioning and normalizing the contrast of the image. As known in the art, image conditioning balances the cosmetics of the image to include dead pixel replacement, static noise normalization, white balance, gain balance, hue balance, saturation balance, and the appropriate band specific image cosmetic balancing, all of which is known in the art. It is noted that each of the steps are performed/controlled by the vision processor 110 at their respective cameras. Subsequently, following these processing steps, these normalized images may preferably be combined into a single fused image. It is noted that fusing may take multiple daisy chained stages based on the limitations of the vision processor used and the number of bands fused. Multiple processors may be required. In such cases the fused output is fused in the next stage with fused imagery from another set of imagers.

It is noted that the optical image systems as described in the present invention may preferably be mounted on a stationary platform and/or on a moving platform. In fact, the fusion is held parallax free across the depth of the field not only not only on a stationary platform but also on a moving platform.

Thus, the method and the system described above not only eliminate the parallax effects across the depth of field of the imagery, but across the depth of magnification during optical zoom. It also provides for chromatically balanced imagery with the fewest compromises when compared to a single lens system. Furthermore, it provides for high quality low cost fusion and image stabilization and eliminates the need to recalibrate every frame (as is required in stationary system with parallax observing moving subjects traversing the depth of field, or from a moving platform), by optically aligning the imagery from multiple cameras and holding focus across the depth of the field. Other benefits include but are not restricted to day/night 360 degrees situational awareness near the vehicle, crisp image fusion to detected concealed objects near vehicle, ability to image concealed weapons on persons and to image through smoke, fog, water day or night.

Although various embodiments that incorporate the teachings of the present invention have been shown and described in detail herein, those skilled in the art can readily devise many other varied embodiments that still incorporate these teachings without departing from the spirit and the scope of the invention.

The invention claimed is:

1. An optical image system comprising:
    a first sensor having a first lens;
    a second sensor having a second lens:
    at least one beam splitter for transmitting an incoming beam of electromagnetic radiation of at least a first band of wavelength at a focal plane array of the first sensor and reflecting an incoming beam of electromagnetic radiation of at least a second band of wavelength at a focal plane array of the second sensor, wherein said first lens is positioned behind the beam splitter for focusing the beam of at least the first band of wavelength onto an image at the focal plane array of the first sensor and the second lens is positioned behind the beam splitter for focusing the beam of the at least the second band of wavelength onto the image at the focal plane array of the second sensor; and
    a vision processor coupled to the first and second lenses to control size and alignment of the images to provide same size and alignment to the first and second sensors.

2. The system of claim 1 further comprising a wide band window for receiving the incoming beams of electromagnetic radiation of the at least first and the second bands of wavelengths prior to passing the beams to the at least one splitter, wherein said window comprise continuously transparent and transmissive material.

3. The system of claim 1 wherein said vision processor functions to retrieve and combine relevant data of the imagery from the at least first band of wavelength and from the at least second band of wavelength, said relevant data comprising pixels of edges in the image having a high energy in spatial frequency domain.

4. The system of claim 1 further comprising a third sensor having a third lens.

5. The system of claim 4 further comprising a second beam splitter for reflecting an incoming beam of electromagnetic radiation of a third band of wavelength at a focal plane array of the third sensor.

6. The system of claim 5 wherein said third lens is positioned behind the second beam splitter for focusing the beam of the third band of wavelength onto the image at the focal plane array of the third sensor.

7. The system of claim 6 wherein said vision processor is coupled to the third sensor to control the size and the alignment of the imagery captured by the third lens and to retrieve and combine relevant data of the image from the at least third band of wavelength.

8. The system of claim 1 further comprising a fourth sensor having a fourth lens.

9. The system of claim 8 further comprising a third beam splitter for reflecting an incoming beam of electromagnetic radiation of a fourth band of wavelength at a focal plane array of the fourth sensor.

10. The system of claim 9 wherein said fourth lens is positioned behind the third beam splitter for focusing the beam of the fourth band of wavelength onto the image at the focal plane array of the fourth sensor.

11. The system of claim 10 wherein said vision processor is coupled to the fourth sensor to control the size and the alignment of the imagery captured by the fourth lens and to retrieve and combine relevant data of the image from the at least fourth band of wavelength.

12. The system of claim 1 wherein said at least one beam splitter comprise optical coating designed to reflect and transmit the incoming beam based on spectrums of radiation of the beam.

13. The system of claim 12 wherein said beam splitter is a dichroic splitter.

14. The system of claim 1 which is mounted on a stationery platform.

15. The system of claim 1 which is mounted on a moving platform.

16. The system of claim 1 wherein said first and second lens are zoom lenses for magnifying the image.

17. The system of claim 1 wherein said first and second sensors comprise one of a visible, SWIR, MWIR or LWIR camera.

18. A method of providing a fused image comprising the steps of:
   transmitting an incoming beam of electromagnetic radiation of at least a first band of wavelength to a focal plane array of at least a first sensor and reflecting an incoming beam of electromagnetic radiation of at least a second band of wavelength to a focal plane array of at least a second sensor;
   using a first lens to focus the beam of at least the first band of wavelength onto an image at the focal plane array of the first sensor;
   using a second lens to focus the beam of at least the second band of wavelength onto the image at the focal plane array of the second sensor; and
   controlling the first and second lenses with a processor the first and second lenses to control the size and alignment of the images to provide same size and alignment to the first and second sensors.

19. The method of claim 18 comprising capturing the image and said beams of the at least a first band of wavelength and of the at least second band of wavelength.

20. The method of claim 18 further comprising retrieving and combining relevant imagery from the at least first band of wavelength and from the at least second band of wavelength, wherein said relevant data comprising pixels of edges in the image having a high energy in spatial frequency domain.

21. The method of claim 18 wherein said fused image is parallax free across depth of field provided via a system on a stationary platform.

22. The method of claim 18 wherein said fused image is parallax free across depth of field provided via a system on a moving platform.

23. The method of claim 18 wherein said first and second beams comprise one of visible, SWIR, MWIR or LWIR.

24. An optical image system comprising:
   a first sensor having a first lens;
   a second sensor having a second lens:
   at least one beam splitter for transmitting an incoming beam of electromagnetic radiation of at least a first band of wavelength at a focal plane array of the first sensor and reflecting an incoming beam of electromagnetic radiation of at least a second band of wavelength at a focal plane array of the second sensor, wherein said first lens is positioned behind the beam splitter for focusing the beam of at least the first band of wavelength onto an image at the focal plane array of the first sensor and the second lens is positioned behind the beam splitter for focusing the beam of the at least the second band of wavelength onto the image at the focal plane array of the second sensor;
   a wide band window for receiving the incoming beams of electromagnetic radiation of the at least first and the second bands of wavelengths prior to passing the beams to the at least one splitter, wherein said window comprise continuously transparent and transmissive material;
   a vision processor coupled to the first and the second sensors for controlling the size and the alignment of the image captured by the first and the second lens; and
   a third sensor having a third lens.

* * * * *